Jan. 13, 1925.
C. C. BALSTON
1,522,938
PHOTOGRAPHIC CAMERA
Original Filed July 30, 1917    2 Sheets-Sheet 1
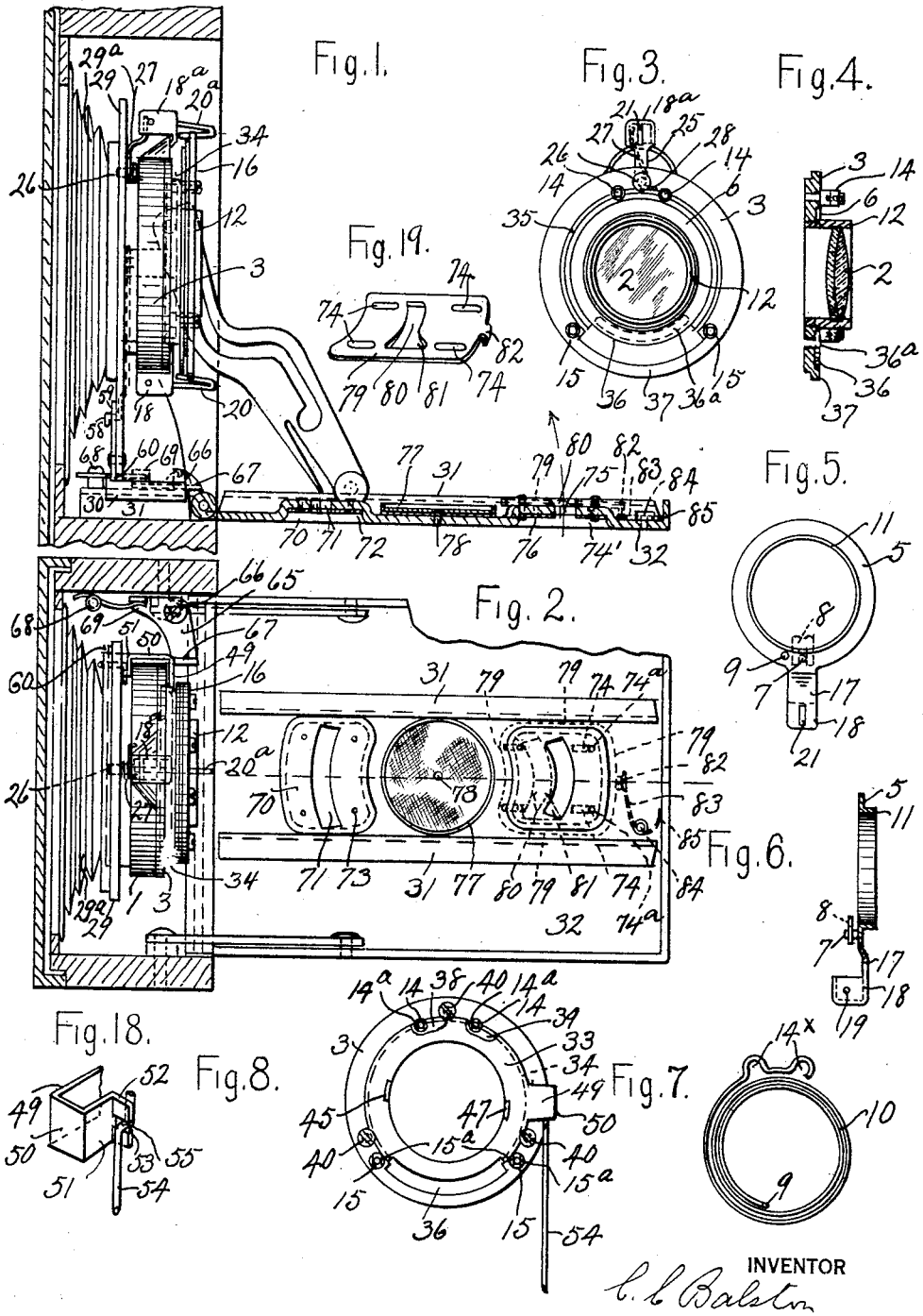
INVENTOR
C. C. Balston
BY T. F. Bourne
ATTORNEY Jan. 13, 1925.
C. C. BALSTON
1,522,938
PHOTOGRAPHIC CAMERA
Original Filed July 30, 1917  2 Sheets-Sheet 2
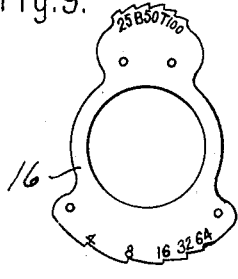
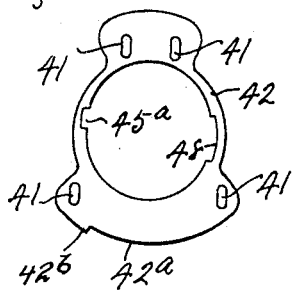
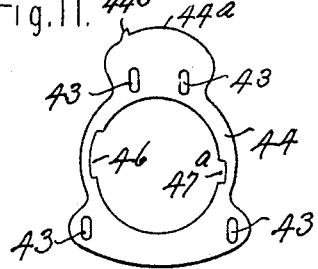
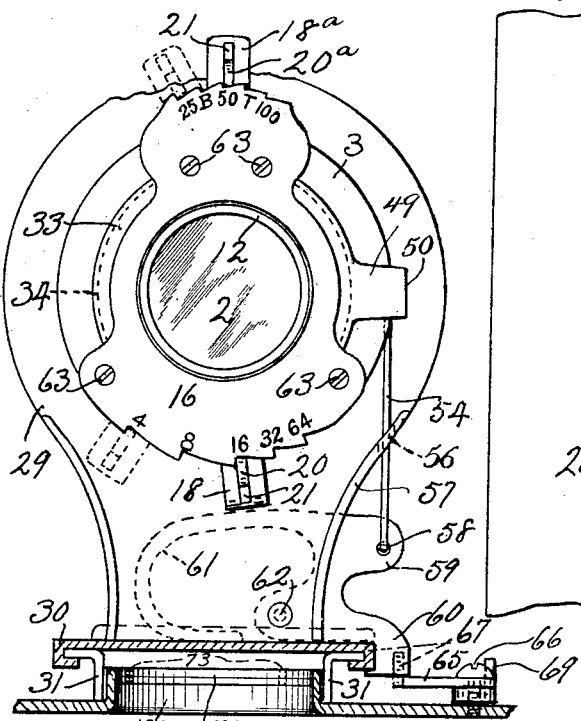
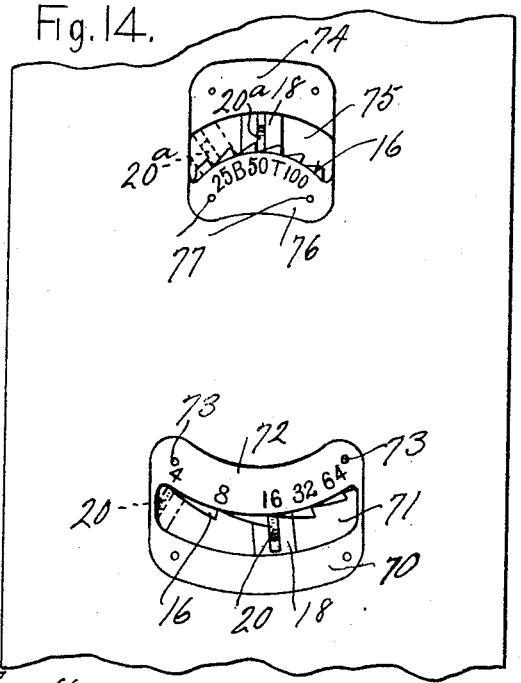
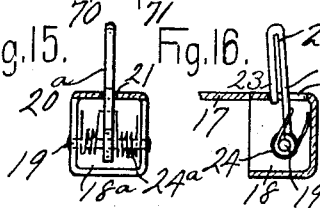
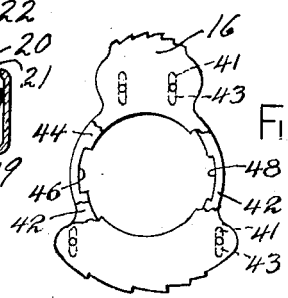
INVENTOR
C. C. Balston
BY T. F. Bourne
ATTORNEY Patented Jan. 13, 1925.

1,522,938

UNITED STATES PATENT OFFICE.

CLYDE C. BALSTON, OF NEW YORK, N. Y.

PHOTOGRAPHIC CAMERA.

Application filed July 30, 1917, Serial No. 183,404. Renewed June 3, 1924.

*To all whom it may concern:*

Be it known that I, CLYDE C. BALSTON, a citizen of the United States, and resident of New York city, borough of Manhattan, in the county of New York and State of New York, have invented certain new and useful Improvements in Photographic Cameras, of which the following is a specification.

My invention relates to improvements in cameras and has for one of its objects the providing of a simpler and quicker method by which the different speeds of the shutter and the various sizes of the diaphragm may be set, to allow the setting thereof in folding cameras while the front hinged or opening part of the camera casing is closed, and to prevent much of the failure in producing good pictures which is due mostly to underexposure by providing automatic trip and return of the shutter to a definite or slow snap-shot speed, and of the diaphragm to a definite or full opening, upon the retreat of the extension portion or of the closing of the camera so that the shutter and the diaphragm will admit a definite or maximum amount of light, should the operator, when again using the camera, forget to reset either or both of them for the light conditions required in the exposure than to be made.

In the accompanying drawings, Fig. 1 is a side elevation, partly in section of the complete camera with lens supporting front release; Fig. 2 is a plan view of Fig. 1 partly broken away; Fig. 3. is a front view of the detached lens stop and shutter casing; Fig. 4 is a vertical section of the front plate thereof; Fig. 5 is a front view of the stop governing collar; Fig. 6 is a side elevation of Fig. 5; Fig. 7 is a spiral wire spring; Fig. 8. is a front view of the casing front plate of Figs. 1, 2 and 3, with a strip collar added. Fig. 9 is a form of shutter and diaphragm index plate used on certain style cameras, but modified as adapted to my purposes; Fig. 10 is a front view of a stop trip plate; Fig. 11 is a front view of a shutter trip plate; Fig. 12 is a front view illustrating the parts of Figs. 9, 10 and 11 assembled, with the indications of Fig. 9 omitted; Fig. 13 is a front elevation, enlarged, of the devices assembled, showing the camera casing door in cross section; Fig. 14 is an enlarged view of the outside of the camera casing door partly broken away; Fig. 15 is a rear detail, enlarged, of the levers for setting and tripping the shutter and the stops regulator; Fig. 16 is a cross sectional view of Fig. 15; Fig. 17 is a perspective view of the part of the Figures 1, 2, 3, 8 and 13; Fig. 18 is a perspective obverse view of the arm 50 of Fig. 13; and Fig. 19 is a detail perspective of plate 79.

For description of my invention:

1, Figs. 1 and 2, represents an ordinary shutter and diaphragm or stop casing, 2 the lens contained in the front plate 3, and 5 the collar as usually adapted to fit turnably in a groove 6 recessed in the face of the said plate 3, the said collar having a pin 7 which engages in the ordinary way by means of a slot as at 8, with the internal stops controlling lever, shown dotted and broken away.

To this collar, by means of a hole, is attached the turned down end 9 of a spiral wire spring 10, the said spring 10 being placed in position on the plate face of the collar 5 around the flange 11 thereof to prevent it from bearing on the lens tube 12, the collar 5, with the said spring being placed in position in the groove six of the plate 3; the outer bent portion of the spring at $14^x$ fitting over the posts 14, 14, which posts together with similar posts 15, 15 are riveted in and extend outwardly from the plate 3. When the collar is so placed in position in the said groove of said plate as aforesaid pin 7 passes into the slot in the stops controlling internal lever 8, the tension of the spring 10 forcing the lever to the lefthand, and so causing, through the connection 8, the diaphragm to open to full opening, the same being number 4 on the index plate.

Instead of having the ordinary pointing or index lever, this stop regulating or controlling collar is provided with a lever 17, which is formed into a cup shape 18, at its outer end. A cross pin 19 passes from side to side of said cup and serves as a pivot for a bent wire lever 20, which lever passes freely through a slot 21 formed in the upper portion of the cup, and is folded over, as at 22, and extended inwardly as at 23. A thin wire spring 24 is coiled around said pin and passes back of the lever, its outer or free ends bearing against the cross wall of the cup. The spring 24 thus exerts a pressure on the lever to keep it in forward or catch position.

The lever 25, Fig. 3, represents the lever as ordinarily used to regulate the spring tension for the various speeds of the shutter, but this lever I extend and add also the cup 18ª, lever 20ª, and spring 24ª. (See Figs. 1, 2, 3 and 13).

At the rear is usually employed a pin 26, Figs. 1 and 3, bedded in the casing 1, and extending into a hole formed in the upright front 29 carried by the sliding carriage, which travels on the ordinary track 31, 31, attached to the camera casing and door 32. 29ª represents the bellows collapsed. Around this pin 26 I place a light coil wire spring 27, the lower end of which 28 is adapted to pass into a hole or otherwise be held for the purpose of tension, and the upper end of which passes freely into and bears against one side of the cup 18, as shown. This spring is employed to insure the full return to starting point, and slowest speed snapshot position of the shutter controlling lever 25.

Over the collar 5, and spring 10, is placed circular plate 33 having a downwardly extending concentric flange 34, Figs. 1, 2, 8 and 13, which flange removably fits in an annular groove 35 recessed in the plate 3. The lower portion of this groove 35 opens out into a recessed section 36, which clearance is made to allow the offset upwardly at 17 (Fig. 6) of the stop controlling lever of the collar 5, to permit said lever at 17 to clear over the plate 3 at 37 in its movement between the bosses 15—15. The said plate 33 is also cut away at 38 and 39 to clear the bosses 14, 14 and is held down in rotatable position by the three screws 40 whose heads overlap the top surface of said plate.

The bosses 14, 14 and 15, 15 are provided with shoulders and parallel flat guide surfaces 14ª, 14ª and 15ª, 15ª on which are adapted to slidably fit by means of slots 41 plate 42, and by similar slots 43, plate 44. The central aperture of each of these plates is of a size to fit loosely over but not bear on the flange 11 of the collar 5, and is elongated to permit of the proper sliding movement of these plates in opposite directions to each other.

Extending upwardly from the face on one side of plate 33 is a lug 45 adapted to enter slot 45ª and actively engage plate 42, and escape slot 46 of plate 44, and on the opposite diameter of plate 33 is a lug 47 adapted to enter slot 47ª of plate 44 and escape slot 48 of plate 42. At one side of circular plate 33 (Figs. 2, 8, 13 and 13) is an extension or arm 49 bent over as at 50, 51 and 52, and slotted as at 53, into which slot a wire 54 with an offset 55 is adapted to loosely fit (see Fig. 18). The other end of said wire passes through a guide hole indicated at 56 in the supporting front flange 57 and loosely but securely connects, by means of a hole 58, with a projection 59 of a spring actuated trip device or lever 60, the spring 61 thereof, and the pivot 62 serving to hold down and to return to normal position the said lever 60. The spring lever herein shown is one used for focussing purpose on a certain style camera, but any other spring actuated lever will serve my purpose as well, the object being to return the arm 50 to normal position, as shown, after it has been moved therefrom. Shoulders 42ᵇ of plate 42, and 44ᵇ of plate 44 may be formed on the respective plates as shown, to limit the backward or returning movement to normal of levers 25 and 17.

Over plates 42 and 44, and held by an extension of the studs 14, 14 and 15, 15, and by screws therein 63, is placed the usual index plate 16 having the shutter speed scale and the stop numbers.

When the arm 50 is fully raised it will be readily understood that the lugs 45 and 47 moving in opposite directions by the consequent rotation of the plate 33 by such action, force plate 42 downwardly and plate 44 upwardly and causes thereby their edges 42ª and 44ª respectively to project beyond the like positioned edges of the index plate 16. When the arm 50 falls again to normal position, the edges 42ª and 44ª of the said plate 42 and 44 recede a small distance within the diameters of the edges of said index plate 16. This said index plate 16, represents one of the styles of index plates in common use; but it will be noted that next to each stop index number I have cut a recess a, the higher portion forming a ratchet tooth, to engage the part 23 of the levers 20 of the stop or diaphragm regulating arm 17, 18; which by virtue of the tension of the spring 24, is caused to enter the bottom of whichever such recess it may be placed opposite, the hold of said lever 20 at 23 against either of the ratchet teeth being maintained by the tension of the spiral spring 10.

The same ratchet tooth formation is made opposite the numbers and indications of the shutter regulating scale, as shown, and the same conditions pertain to the lever 20ª, of the regulating arm 25 in connection therewith.

Assuming that the shutter speed controlling arm 25, 20, 23 is moved to 50 on the shutter speed index, and that the diaphragm regulating lever 17, 18, 20ª is moved to 16 on the aperture scale, and that the arm 50 is then raised to the dotted line 64, the movement of the surfaces 42ª of plate 42 and 44ª of plate 44, will force outwardly the levers 20, 20ª from engagement with the respective ratchet teeth of both index scales, and the levers 17, 18, 20, 23 by virtue of the tension of their springs 10 and 27, will snap back to the dotted position in which both levers are shown in Fig. 13, thereby resetting the shutter speed control lever to the slowest safe shutter snap shot speed, viz: 1/25th second, and the diaphragm to the largest ordinary diaphragm opening, viz: U. S. 4. A trip device represented herein by a lever 65 is pivoted at 66 to the camera casing, or to the camera door, if desired. It is provided with a turned-up portion 67 formed into an incline at its upper surface as shown. A spring (Fig. 2) is secured at 68 to the camera casing, the tail end of said spring bearing as shown against the side wall of the camera, and the other end impinging on an upturned lug of the said lever 65 at 69. Looking at the front of the camera with regard to the incline of the angle imparted to the first named upturned portion of said trip lever at 65, it will be readily seen, that, when the lens carrying sliding front is forced back into the camera case, after being extended and used, the foot 60 of the spring lever pivoted to the front at 62, will rise up and glide over the top of the inclined surface 67 of the trip lever 65 (since said lever 65 cannot be forced backwardly out of position, due to its other arm at 69 resting against the camera side wall), and thereby force upwardly the arm 50, and return the controlling levers to normal position after the manner stated. But when the lens carrying front is again drawn out of the camera casing the lever foot 60 aforesaid, having assumed a position behind the portion 67, causes the said lever 65 and its portion 67 to move momentarily forward and sideways out of the path of the lever foot 60 to then prevent tripping the shutter and diaphragm regulating levers from their set positions. While I have described manual setting of the shutter and of the diaphragm controlling means or levers to desired positions, whereby when the supporting front for the lens is pushed back into the camera casing said diaphragm and shutter will be caused to be restored to their normal positions respectively, it will be understood that I may, if desired, according to conditions of light, set either the shutter, through its controlling means, or the diaphragm, through its controlling means, to a desired position, without requiring the setting of the other, yet upon the lens support being pushed back into the camera casing said shutter or diaphragm so set only will be caused to return to its normal position. Furthermore, while I have described the normal position of the diaphragm controlling means as retaining the diaphragm in a position having its largest opening, and the shutter controlling means as normally in a position for slowest snap-shot speed of shutter, it will be understood that the normal positions of the shutter and diaphragm may be established in such a manner that the normal diaphragm opening may be of a different size than that I have referred to, and the normal position of the shutter controlling means may be with respect to a faster or slower speed of the shutter than that I have referred to. In either event, whichever controlling means, either for the diaphragm or for the shutter, or both, may have been set to a different position from its normal position, it will be returned to such normal position when the lens support is pushed back into the casing.

In Figs. 1, 2 and 14 will be seen a depression or recess 70 recessed from the outer side in the plate forming the camera door, between the lens front carriage tracks 31, 31. This recess is formed in the manner shown by offsetting a portion of the metal door, or if the door be made of wood by cutting a depression therein and a curved slot 71 which corresponds in curvature to the sweep of the stop controlling lever and is cut through the bottom of said recessed portion of sufficient width to freely admit and allow to operate the lever 20, 23 of said stop regulating arm. An index plate 72 corresponding in designations to those of the diaphragm index plate carried by the lens support, may be placed in said recess and secured therein as at 73. At 74' is a similar recess and slot 75, and index plate 76 for speed of shutter, similar to that carried by the lens front, and similarly secured in any suitable manner thereto. The diaphragm and the shutter may be set or operated without regard to these recesses in the ordinary way when the camera door is opened, and either before or after the lens supporting front is drawn out to the focus scale positions (the focus scale device not being shown), by pushing the levers 20, 20$^a$ to the righthand to the desired index catch recess and indication.

But when the camera is folded and the camera front or door closed, the ends 22 of the catch levers 20, 20$^a$ protrude each through its respective slot 71 or their extreme outer ends at 22 not projecting quite as far as the outer surface of the said camera door.

As the index plates 72 and 76 are then visible from the outside (see Fig. 14) it is clear that the levers 20, 20$^a$ can be similarly set to any required indication and hold in the catch recess thereof.

Furthermore, the prominent visibility of the shutter speed and the diaphragm indications on the outside of the camera is a reminder to the operator to set same. Moreover the setting of said levers is a simple and easier matter if done while the camera is in closed, compact form, than when in the awkward extended shape. Since the slots 71, 75 may admit a certain amount of dust to the interior of the camera and lens, a cup 77 riveted or otherwise secured to the inside of the camera door as at 78 between the tracks 31, and of sufficient size to receive freely the lens holding tube 12 is located, and may contain in its bottom a felt or plush pad against which the lens holding tube 12 may closely bear when the camera door 32 is closed. But the slots 71, 75 may be almost entirely closed when the levers 20, 20ª are at normal rest position by the employment of a thin plate of metal as shown in dotted outer lines 79 which plate has a curved slot 80 with a widened portion having an angular edge at 81, (see Fig. 19) through which slot lever 20ª may emerge, which plate 79 is proveded with guide slots 74 adapted to fit and be guided by the pins 74ª. A lug 82 formed on said plate is impinged on by a spring 83 secured at 84, and having its tail bearing on the flange of the camera door at 85.

When lever 20ª is forced across the slot in the recessed part of the camera door it, by means of the angular edge in the slot at 81 in the slide plate 79, causes the curved slot thereof 80 to coincide with the slot 75. The spring 83 returns the slide plate 79 after lever 20 has returned to the space at 81.

It is obvious that the device of regulating catch and release levers 20, 20ª and the companion mechanism thereto described herein, together with the recesses 70, 74 and slots 71, 75 described herein as applied to folding cameras may also be applied to cameras having a non-hinged front, such as solid and extensible box cameras, etc.

I do not seek to limit myself to the actual construction set forth herein, as I am aware that many variations may be made in structure and arrangements to accomplish the same results.

Having now described my invention what I claim is:

1. A camera comprising a casing, a lens having an adjustable diaphragm and a controlling device for said diaphragm, a movable front wall on said camera, said wall having an opening opposing said diaphragm controlling device to permit the movement of said controlling device through said opening, said wall having a recessed area opposing said opening, and a scale bearing the diaphragm aperture controlling indications located within said recessed area.

2. A camera having a casing and movable wall, a lens having light controlling means to determine and control the light admitted through said lens, said wall having an opening opposing and adjacent to said control means, said wall having a recessed area communicating with said opening, and a scale having light admitting and controlling indications located in said recess.

3. A camera having a lens, light controlling means to determine the amount of light admitted through said lens and adapted to be detained in a normal position and to be set and detained in different spaced positions other than the normal position, and means comprising mechanism in connection with said first named means to cause automatic return thereof to normal from either of such set positions.

4. A camera having a lens, light controlling means to determine the amount of light admitted through said lens and adapted to be detained in a normal position and to be set and detained in different spaced positions other than the normal position, means comprising mechanism in connection with said first named means to cause automatic return thereof to normal from either of such set positions, and an index scale in relation to said first named means having its indications corresponding to the different positions to which the first named means may be set from normal.

5. A camera having a lens, light controlling means to determine the amount of light admitted through said lens and adapted to be detained in a normal photographic position and to be set and detained in a photographic position other than normal, and means comprising mechanism in connection with said first named means to cause automatic return thereof to normal from such set photographic position; complemental means upon the camera cooperative with said second named means for causing operation of the second named means for causing resetting of the first named means to normal.

6. A camera having a lens, light controlling means to determine the amount of light admitted through said lens and adapted to be detained in a normal photographic position and to be set and detained in a photographic position other than normal, and means comprising mechanism in connection with said first named means to cause automatic return thereof to normal from such set photographic position, complemental means upon the camera cooperative with said second named means for causing operation of the second named means upon movement of a portion of said means and of the camera relatively one to the other.

7. A camera having a lens, light controlling means to determine the amount of light admitted through said lens and adapted to be detained in a normal position and to be set and detained in a position other than normal, and means comprising mechanism in connection with said first named means to cause automatic return thereof to normal from such set position, complemental means upon the camera cooperative with said second named means for causing operation of the second named means upon movement of the lens in one direction relatively to the camera.

8. A camera having a lens carried on a support movable from a retracted position to extended photographic positions, said lens being provided with a diaphragm having means whereby it may be adjusted from a normal sized photographic opening to other sized photographic openings, means tending to return said diaphragm to said normal sized opening when adjusted therefrom, means for retaining such adjusting means in any desired adjusted position, and means for releasing said retaining means when said lens support is retracted, whereby upon retraction of said lens support said diaphragm will be returned, from any abnormal sized opening to which it may have been adjusted, to said normal sized opening.

9. A camera having a lens carried on a support movable from a retracted position to extended photographic positions, said lens being provided with a diaphragm having means whereby it may be adjusted from a normal sized photographic opening to other sized photographic openings, a spring tending to return said diaphragm to said normal sized opening when adjusted therefrom, means for retaining such adjusting means in any desired adjusted position, and means for releasing said retaining means when said lens support is retracted, whereby upon retraction of said lens support said diaphragm will be returned, from any abnormal sized opening to which it may have been adjusted, to said normal sized opening.

10. A camera having a lens carried on a support movable from a retracted position to extended photographic positions, said lens being provided with a shutter having an adjustable speed controlling means and with a diaphragm having means whereby it may be adjusted from a normal sized photographic opening to other sized photographic openings, means tending to return said shutter controlling means to a normal speed position when adjusted therefrom, means tending to return said diaphragm to said normal sized photographic opening when adjusted therefrom, means for retaining said shutter controlling means and said diaphragm adjusting means each in any desired adjusted position and means for releasing both said retaining means when said lens support is retracted whereby upon retraction of said lens support both said shutter speed controlling means and said diaphragm will be returned from any abnormal position to which either or both of them may have been adjusted to said normal speed position and said normal sized opening respectively.

11. A camera having a lens carried on a support movable to photographic positions, said lens being provided with a diaphragm having means whereby it may be adjusted from a normal sized photographic opening to other sized photographic openings, means to control said diaphragm for different sized photographic openings, said controlling means being provided with a movable detainer, complemental spaced means upon said support cooperative with said detainer, a spring normally operative to move said controlling means from one sized photographic opening to said normal opening when adjusted therefrom, a member movable upon said support and cooperative with said detainer to release it from said complemental means to permit operation by the spring of said controlling means, and means upon the camera to actuate said member when the lens is retracted from photographic position whereby upon retraction of said lens support said diaphragm will be returned from any abnormal sized opening to which it may have been adjusted, to said normal sized opening.

12. A camera having a lens carried on a support movable to extended photographic positions, said lens being provided with a diaphragm having means whereby it may be adjusted from a normal sized photographic opening to other sized photographic openings, means tending to return said diaphragm to said normal sized opening when adjusted therefrom, means for retaining such adjusting means in any desired adjusted position, and means comprising a rotative member for releasing said retaining means when said lens support is retracted, whereby upon retraction of said lens support said diaphragm will be returned, from any abnormal sized opening to which it may have been adjusted, to said normal sized opening.

13. A camera having a lens carried on a support movable to extended photographic positions, said lens being provided with a shutter having an adjustable speed controlling means and with a diaphragm having means whereby it may be adjusted from a normal sized photographic opening to other sized photographic openings, means tending to return said shutter controlling means to a normal speed position when adjusted therefrom, means tending to return said diaphragm to said normal sized photographic opening when adjusted therefrom, means for retaining said shutter controlling means and said diaphragm adjusting means each in any desired adjusted position and means comprising a rotative member for releasing both said retaining means when said lens support is retracted whereby upon retraction of said lens support, both said shutter speed controlling means and said diaphragm will be returned from any abnormal position to which either or both of them may have been adjusted to said normal speed position and said normal sized opening respectively.

14. A camera having a lens carried on a support movable to extended photographic positions, said lens being provided with means to control the amount of light admitted through the lens for a normal photographic condition and for other photographic conditions, means to support a light sensitive element within the camera, and means to automatically change said light controlling means from any abnormal adjusted condition to which it may have been adjusted to said normal photographic condition when the lens support is moved from such extended photographic positions.

15. A camera having a lens carried on a support movable to extended photographic focusing positions, said lens having means to establish a normal photographic condition and other photographic conditions for the passage of light through the lens for photographing, and automatic means to operate said first named means to change it from one of such other photographic light conditions to said normal photographic light condition after movement of the lens from focusing position.

16. A camera having a lens carried on a support movable to extended photographic focusing positions, said lens being provided with a shutter provided with speed controlling means, means to detain the shutter controlling means in a normal photographic position and in other photographic speed positions, means to automatically move said controlling means from one of said other photographic speed positions to said normal position when released, said lens being also provided with a diaphragm having means whereby it may be adjusted from a normal photographic opening to other photgraphic openings, means to control the diaphragm for different photographic openings, means to detain said controlling means in different adjusted positions, means tending to automatically move the diaphragm controlling means to said normal position when adjusted therefrom, means to release said shutter and diaphragm controlling means to cause said controlling means automatically to move from one adjusted position to said normal positions, and means upon the camera to actuate said releasing means when the lens supporting means is moved from photographic position, whereby said shutter and diaphragm will be returned from any abnormal position to which either or both of them may have been adjusted to their respective normal positions.

17. A camera having a lens, light controlling means to determine the amount of light admitted through said lens and adapted to be detained in a normal photographic position and to be set and detained in a photographic position other than normal, and means upon the camera complemental to the first named means for causing operation thereof to cause the first named means to be reset to said normal photographic position.

18. A camera having a lens, means to support a photographic light sensitive surface, light controlling means to determine the amount of light admitted from said lens to said light sensitive surface and adapted to be detained in a normal photographic condition and to be set and detained in a photographic condition other than normal, and means upon the camera complemental to said light controlling means for causing the latter to be reset to said normal photographic condition.

Signed at New York city, in the county of New York and State of New York this 27th day of July A. D. 1917.

CLYDE C. BALSTON.

Witnesses:
T. F. BOURNE,
MARIE F. WAINWRIGHT.